US010719401B2

(12) United States Patent
Goldberg et al.

(10) Patent No.: US 10,719,401 B2
(45) Date of Patent: Jul. 21, 2020

(54) INCREASING DATA RECOVERABILITY DURING CENTRAL INODE LIST LOSS

(71) Applicant: International Business Machines Corporation, Armonk, NY (US)

(72) Inventors: Itzhack Goldberg, Haifa (IL); Deborah A. Messing, Beit Sehemesh (IL)

(73) Assignee: International Business Machines Corporation, Armonk, NY (US)

( * ) Notice: Subject to any disclaimer, the term of this patent is extended or adjusted under 35 U.S.C. 154(b) by 125 days.

(21) Appl. No.: 16/129,429

(22) Filed: Sep. 12, 2018

(65) Prior Publication Data

US 2020/0081787 A1    Mar. 12, 2020

(51) Int. Cl.
*G06F 11/14* (2006.01)
*G06F 16/16* (2019.01)
*G06F 16/17* (2019.01)
*G06F 16/174* (2019.01)

(52) U.S. Cl.
CPC ........ *G06F 11/1435* (2013.01); *G06F 16/164* (2019.01); *G06F 16/1727* (2019.01); *G06F 16/1748* (2019.01); *G06F 2201/81* (2013.01); *G06F 2201/835* (2013.01)

(58) Field of Classification Search
None
See application file for complete search history.

(56) References Cited

U.S. PATENT DOCUMENTS

| 6,163,856 A  | 12/2000 | Dion et al.   |
| 6,208,999 B1 | 3/2001  | Spilo et al.  |
| 6,584,582 B1 | 6/2003  | O'Connor      |
| 7,415,488 B1 | 8/2008  | Muth et al.   |

(Continued)

FOREIGN PATENT DOCUMENTS

| EP | 0702815 B1 | 8/2000 |
| EP | 3125119 A1 | 2/2017 |

OTHER PUBLICATIONS

Sapuntzakis, Constantine. A co-locating fast file system for UNIX. Diss. Massachusetts Institute of Technology, 1998. (Year: 1998).*

(Continued)

*Primary Examiner* — Charles Rones
*Assistant Examiner* — Hewy H Li
(74) *Attorney, Agent, or Firm* — Zilka-Kotab, P.C.

(57) ABSTRACT

A computer-implemented method, according to one embodiment, includes: receiving a write request which includes data, and allocating an inode entry in a central inode list, such that the inode entry corresponds to the data received. The data is allocated to a block of storage space in memory. Moreover, one or more instructions to write the data to the block of storage space are sent. A determination is also made as to whether the data fills a threshold amount of a last block of storage space. In response to determining that the data does not fill the threshold amount of the last block of storage space, one or more instructions to create an identifier at an end of the data are sent. Furthermore, one or more instructions to store a copy of the inode entry after the identifier in the last block of storage space are sent.

25 Claims, 8 Drawing Sheets

(56) References Cited

U.S. PATENT DOCUMENTS 7,647,355 B2 * 1/2010 Best .................. G06F 3/0608
707/999.2
2005/0144501 A1 6/2005 Kim et al.

OTHER PUBLICATIONS

Wu, Xingbo, Zili Shao, and Song Jiang. "Selfie: co-locating metadata and data to enable fast virtual block devices." Proceedings of the 8th ACM International Systems and Storage Conference. 2015. (Year: 2015).*

Krzyzanowski, Paul. "CS416: Operating Systems Design". <https://www.cs.rutgers.edu/~pxk/416/notes/content/14-filesystems-impl-slides-6.pdf>. Mar. 25, 2015. (Year: 2015).*

Ganger et al., "Embedded Inodes and Explicit Grouping: Exploiting Disk Bandwidth for Small Files," Proceedings of the USENIX Technical Conference, Jan. 1997, pp. 1-17.

* cited by examiner

INCREASING DATA RECOVERABILITY DURING CENTRAL INODE LIST LOSS

BACKGROUND

The present invention relates to data retention, and more specifically, this invention relates to increasing data recoverability in situations involving loss of a central inode list.

The continued increase of resilience for filesystems is an issue which is addressed on ongoing basis. Most filesystems initially start as a superblock which is located at an arbitrary address in a logical unit number (LUN), volume, logical disk, etc. From the superblock, a structure is built which ultimately becomes the filesystem. Files (e.g., unique groupings of data) stored on the filesystem are typically separated into a number of blocks which are spread across the persistent storage space of memory in order to achieve even distribution, e.g., for performance reasons. Thus, in order to describe each of these blocks and keep track of where they are located in the persistent storage space, a structure called a central inode list is used. This inode list identifies where the logical block addresses (LBAs) that constitute the various portions (e.g., blocks) of a given file are located in the memory space, and how these correlate to the corresponding locations in the persistent storage space. Accordingly, each file has an inode which is stored in one or more arrays depending on the architecture.

Losing the central inode list undesirably causes the entire filesystem to essentially become useless, as there is no way of identifying where each file begins, much less where each of the various blocks that belong to that file reside throughout the memory. In other words, without the central inode list, the information stored in memory essentially becomes an indecipherable string of logical "1s" and "0s".

Accordingly, conventional implementations have attempted to maintain a redundant copy of the central inode list, e.g., such that it may be used in situations where the central inode list is lost. However, this conventional replication strategy has proven to be an impractical option, as the redundant copy of the central inode list consumes an undesirably large amount of storage space. Thus, conventional technology has been forced to choose between poor data retention rates and significant reductions to storage capacity.

It follows that a data storage scheme which is able to maintain data retention in the face of inode list failure without sacrificing storage capacity in doing so is desirable.

SUMMARY

A computer-implemented method, according to one embodiment, includes: receiving a write request which includes data, and allocating an inode entry in a central inode list, such that the inode entry corresponds to the data received. The data is allocated to a block of storage space in memory, the memory including multiple blocks of storage space. Moreover, one or more instructions to write the data to the block of storage space are sent. A determination is also made as to whether the data fills a threshold amount of a last block of storage space. In response to determining that the data does not fill the threshold amount of the last block of storage space, one or more instructions to create an identifier at an end of the data are sent. Furthermore, one or more instructions to store a copy of the inode entry after the identifier in the last block of storage space are sent.

Storing a copy of each inode entry in an unused tail region of a last block of storage space allocated to hold the data included in each respective write request achieves a distributed backup of the central inode list. Moreover, by maintaining this distributed copy of the central inode list, the central inode list itself becomes resilient against data loss without consuming any otherwise usable storage space. Thus, the various improvements achieved by the approaches included herein come at no storage cost, which is significantly desirable, particularly in view of the shortcomings experienced by conventional implementations.

The metadata included in each of these inode entry copies can also be used in some approaches to reconstruct the central inode list, or at least a portion thereof, e.g., in situations where the central inode list is lost or otherwise inaccessible. For instance, in some approaches a disaster situation is detected in which the central inode list is inaccessible. In response, information stored in each of the multiple blocks of storage space is scanned, and each identifier included in the information is detected. Each of the detected identifiers are further used to locate a corresponding copy of an inode entry. Each of the located inode entry copies are in turn used to locate data which corresponds thereto. Furthermore, the located data is copied to a second memory where it may be used to reconstruct the central inode list which may have otherwise have been lost.

It follows that various ones of the approaches described herein are desirably able to replicate entries in the central inode list such that no otherwise usable storage space is consumed in doing so. Distributing these inode entry copies across the various blocks of storage space also desirably reduces the exposure to a total data loss. For instance, even in the event that the central inode list becomes inaccessible, the approaches included herein remain resistant to a total loss of the information included in the inode list.

However, the amount of unused storage space available in each of the blocks is limited in some cases. Thus, in order to increase the number files having a last block with an adequate amount of unused storage space to store an identifier and a corresponding copy of an inode entry, the storage footprint of each of the inode entry copies may be reduced. This reduced footprint is achieved in some approaches by decreasing the amount of metadata included in the copy of an inode entry with respect to the amount of metadata included in the inode entry itself. In other words, the metadata included in the copy of an inode entry is reduced in some approaches to only include the metadata which would be used in reconstructing a central inode list.

A computer program product, according to another embodiment, includes a computer readable storage medium having program instructions embodied therewith. The computer readable storage medium is not a transitory signal per se. Moreover, the program instructions are readable and/or executable by a processor to cause the processor to perform the processes of the above mentioned computer-implemented method. Accordingly, the present embodiment is able to achieve the same or similar improvements to the storage system as those described above.

A system, according to yet another embodiment, includes: a processor; and logic integrated with the processor, executable by the processor, or integrated with and executable by the processor, the logic being configured to perform the processes of the above mentioned computer-implemented method. Accordingly, the present embodiment is able to achieve the same or similar improvements to the storage system as those described above.

A computer program product, according to another embodiment, includes a computer readable storage medium having program instructions embodied therewith. The computer readable storage medium is not a transitory signal per se. Moreover, the program instructions are readable and/or executable by a processor to cause the processor to perform a method which includes: detecting, by the processor, a disaster situation in which a central inode list is inaccessible. Each entry in the central inode list corresponds to data stored in a block of storage space in memory, and the memory includes multiple blocks of storage space. Information stored in each of the multiple blocks of storage space is scanned by the processor, and each identifier included in the information is detected by the processor. Specifically, an identifier in a given block of storage space is located at an end of data stored in the given block. Each of the detected identifiers are further used by the processors to locate a corresponding copy of an inode entry. Each of the located inode entry copies are also used by the processor to locate data which corresponds thereto. Furthermore, the located data is copied to a second memory by the processor.

Again, storing a copy of each inode entry in an unused tail region of a last block of storage space allocated to hold the data included in each respective write request achieves a distributed backup of the central inode list. Moreover, by maintaining this distributed copy of the central inode list, the central inode list itself becomes resilient against data loss without consuming any otherwise usable storage space. The metadata included in each of these inode entry copies can also be used in some approaches to reconstruct the central inode list, or at least a portion thereof, e.g., in situations where the central inode list is lost or otherwise inaccessible. For instance, in some approaches a disaster situation is detected in which the central inode list is inaccessible. In response, information stored in each of the multiple blocks of storage space is scanned, and each identifier included in the information is detected. Each of the detected identifiers are further used to locate a corresponding copy of an inode entry. Each of the located inode entry copies are in turn used to locate data which corresponds thereto. Furthermore, the located data is copied to a second memory where it may be used to reconstruct the central inode list which may have otherwise have been lost.

It follows that various ones of the approaches described herein are desirably able to replicate entries in the central inode list such that no otherwise usable storage space is consumed in doing so. Distributing these inode entry copies across the various blocks of storage space also desirably reduces the exposure to a total data loss. For instance, even in the event that the central inode list becomes inaccessible, the approaches included herein remain resistant to a total loss of the information included in the inode list.

However, the amount of unused storage space available in each of the blocks is limited in some cases. Thus, in order to increase the number files having a last block with an adequate amount of unused storage space to store an identifier and a corresponding copy of an inode entry, the storage footprint of each of the inode entry copies may be reduced. This reduced footprint is achieved in some approaches by decreasing the amount of metadata included in the copy of an inode entry with respect to the amount of metadata included in the inode entry itself. In other words, the metadata included in the copy of an inode entry is reduced in some approaches to only include the metadata which would be used in reconstructing a central inode list.

A computer-implemented method, according to another embodiment, includes performing the processes of the above mentioned computer program product. Accordingly, the present embodiment is able to achieve the same or similar improvements to the storage system as those described above.

Other aspects and embodiments of the present invention will become apparent from the following detailed description, which, when taken in conjunction with the drawings, illustrate by way of example the principles of the invention.

DETAILED DESCRIPTION

Figure 1:
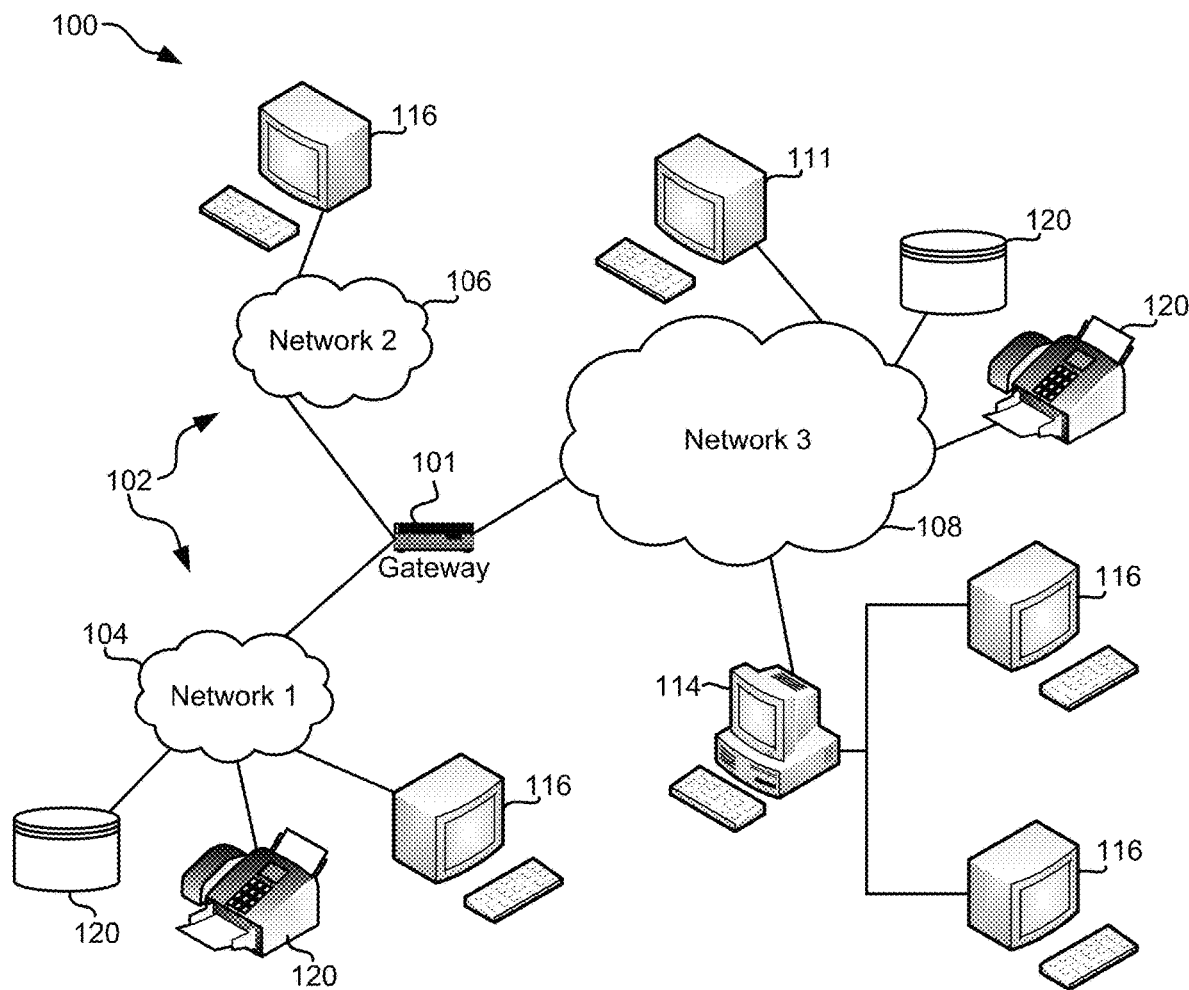
FIG. 1 is a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for maintaining a distributed copy of a central inode list, the distributed copy being resilient against data loss and which does not consume otherwise usable storage space. Thus, the various improvements achieved by the approaches included herein come at no storage cost, which is significantly desirable, particularly in view of the shortcomings experienced by conventional implementations, e.g., as will be described in further detail below.

In one general embodiment, a computer-implemented method includes: receiving a write request which includes data, and allocating an inode entry in a central inode list, such that the inode entry corresponds to the data received. The data is allocated to a block of storage space in memory, the memory including multiple blocks of storage space. Moreover, one or more instructions to write the data to the block of storage space are sent. A determination is also made as to whether the data fills a threshold amount of a last block of storage space. In response to determining that the data does not fill the threshold amount of the last block of storage space, one or more instructions to create an identifier at an end of the data are sent. Furthermore, one or more instructions to store a copy of the inode entry after the identifier in the last block of storage space are sent.

In another general embodiment, a computer program product includes a computer readable storage medium having program instructions embodied therewith. The computer readable storage medium is not a transitory signal per se. Moreover, the program instructions are readable and/or executable by a processor to cause the processor to perform a method which includes: receiving, by the processor, a write request which includes data; and allocating, by the processor, an inode entry in a central inode list, such that the inode entry corresponds to the data received. The data is allocated, by the processor, to a block of storage space in memory, the memory including multiple blocks of storage space. Moreover, one or more instructions to write the data to the block of storage space are sent by the processor. A determination is also made by the processor, as to whether the data fills a threshold amount of a last block of storage space. In response to determining that the data does not fill the threshold amount of the last block of storage space, one or more instructions to create an identifier at an end of the data are sent by the processor. Furthermore, one or more instructions to store a copy of the inode entry after the identifier in the last block of storage space are sent by the processor.

In yet another general embodiment, a system includes: a processor, and logic integrated with the processor, executable by the processor, or integrated with and executable by the processor. The logic is configured to: receive, by the processor, a write request which includes data; and allocate, by the processor, an inode entry in a central inode list, such that the inode entry corresponds to the data received. The data is allocated, by the processor, to a block of storage space in memory, the memory including multiple blocks of storage space. Moreover, one or more instructions to write the data to the block of storage space are sent by the processor. A determination is also made by the processor, as to whether the data fills a threshold amount of a last block of storage space. In response to determining that the data does not fill the threshold amount of the last block of storage space, one or more instructions to create an identifier at an end of the data are sent by the processor. Furthermore, one or more instructions to store a copy of the inode entry after the identifier in the last block of storage space are sent by the processor.

In another general embodiment, a computer program product includes a computer readable storage medium having program instructions embodied therewith. The computer readable storage medium is not a transitory signal per se. Moreover, the program instructions are readable and/or executable by a processor to cause the processor to perform a method which includes: detecting, by the processor, a disaster situation in which a central inode list is inaccessible. Each entry in the central inode list corresponds to data stored in a block of storage space in memory, and the memory includes multiple blocks of storage space. Information stored in each of the multiple blocks of storage space is scanned by the processor, and each identifier included in the information is detected by the processor. Specifically, an identifier in a given block of storage space is located at an end of data stored in the given block. Each of the detected identifiers are further used by the processors to locate a corresponding copy of an inode entry. Each of the located inode entry copies are also used by the processor to locate data which corresponds thereto. Furthermore, the located data is copied to a second memory by the processor.

In still another general embodiment, a computer-implemented method includes: detecting a disaster situation in which a central inode list is inaccessible. Each entry in the central inode list corresponds to data stored in a block of storage space in memory, and the memory includes multiple blocks of storage space. Information stored in each of the multiple blocks of storage space is scanned, and each identifier included in the information is detected. Specifically, an identifier in a given block of storage space is located at an end of data stored in the given block, and the copy of an inode entry is located after the corresponding identifier in the respective block of storage space. Each of the detected identifiers are further used to locate a corresponding copy of an inode entry. Each of the located inode entry copies are also used to locate data which corresponds thereto. Furthermore, the located data is copied to a second memory.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one approach.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some approaches.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
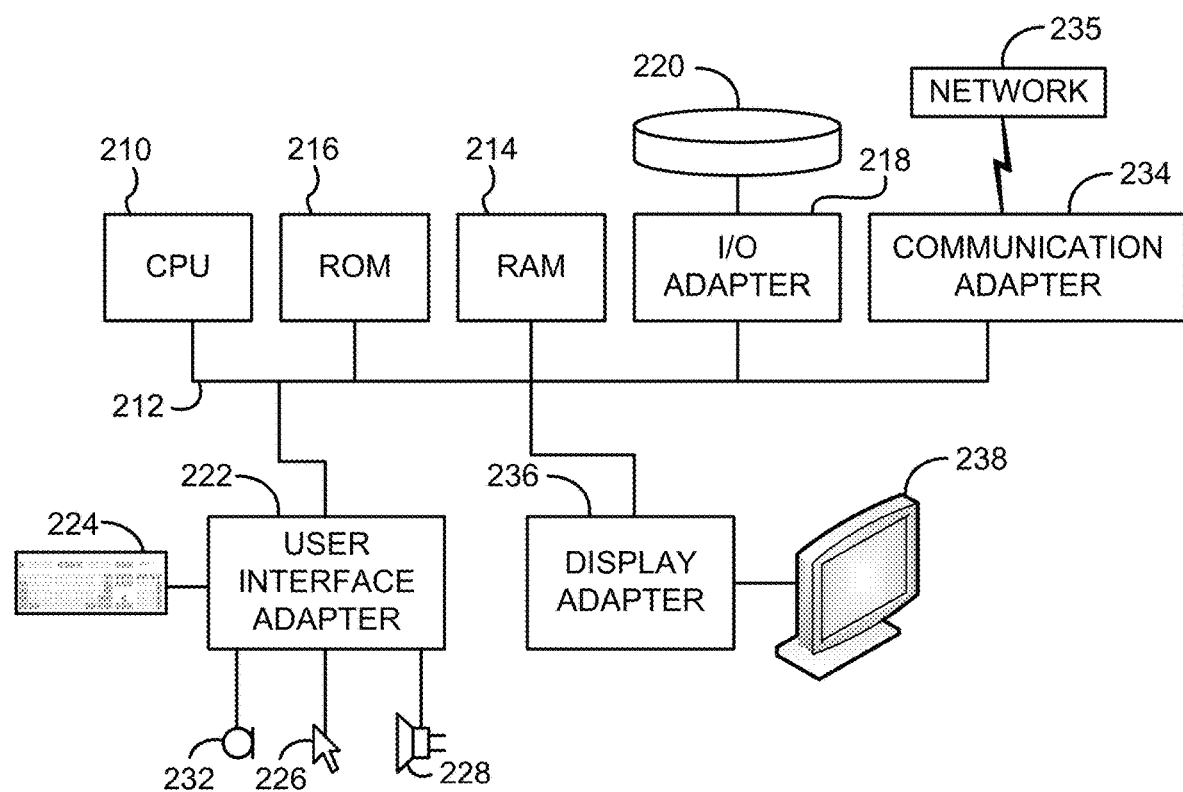
FIG. 2 is a representative hardware environment that may be associated with the servers and/or clients of FIG. 1, in accordance with one embodiment.

FIG. 2 shows a representative hardware environment associated with a user device 116 and/or server 114 of FIG. 1, in accordance with one approach. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred approach may also be implemented on platforms and operating systems other than those mentioned. A preferred approach is written using eXtensible Markup Language (XML), C, and/or C++ language, or other programming languages, along with an object oriented programming methodology. Object oriented programming (OOP), which has become increasingly used to develop complex applications, may be used.

Figure 3:
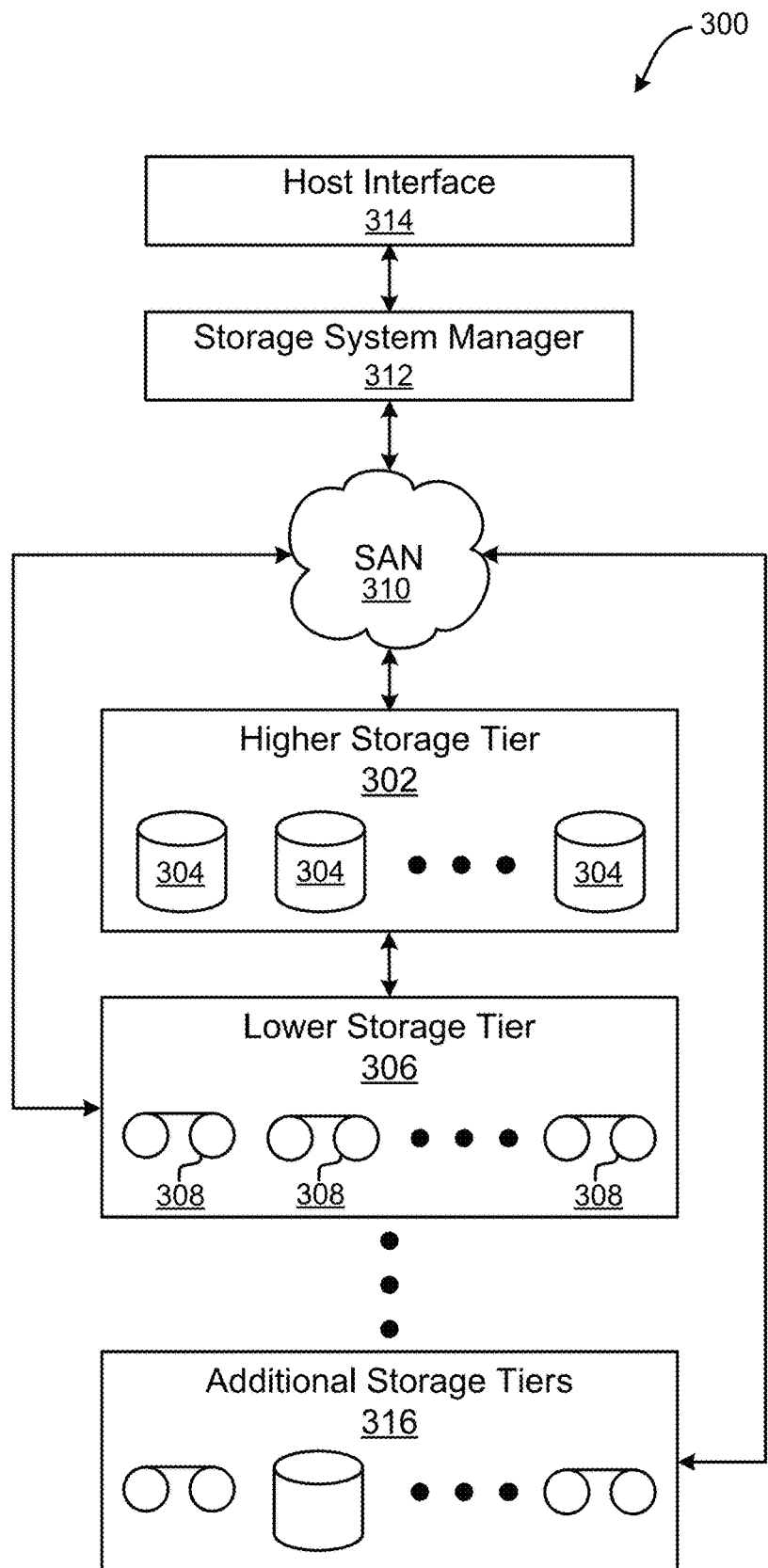
FIG. 3 is a tiered data storage system in accordance with one embodiment.

Now referring to FIG. 3, a storage system 300 is shown according to one embodiment. Note that some of the elements shown in FIG. 3 may be implemented as hardware and/or software, according to various approaches. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more approaches, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the approaches presented herein.

According to some approaches, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various approaches.

As previously mentioned, the continued increase of resilience for filesystems in the face of storage-related disasters is an issue which is addressed on ongoing basis. Particularly, situations in which a central inode list is lost has traditionally proven to be a significant issue in terms of retaining data and maintaining operation of the storage system as a whole. Losing the central inode list undesirably causes the entire filesystem to essentially become useless, as there is no way of identifying where each file begins, much less where each of the various blocks that belong to that file reside throughout the memory. In other words, without the central inode list, the information stored in memory essentially becomes an indecipherable string of logical "1s" and "0s".

Accordingly, conventional implementations have attempted to maintain a redundant copy of the central inode list, e.g., such that it may be used in situations where the central inode list is lost. While these attempts to replicate the inode list and its indirect blocks is plausible, doing so would cause a significant detriment to system performance and integrity, as multiple copies have to be maintained. Furthermore, these conventional strategies have proven to be impractical options, as the redundant copies of the central inode list consume an undesirably large amount of storage space otherwise available for user data. Thus, conventional technology has been forced to choose between poor data retention rates and significant reductions to storage capacity.

It follows that a data storage scheme which is able to maintain data retention in the face of inode list failure without sacrificing storage capacity in doing so is desirable.

In sharp contrast to the aforementioned shortcomings experienced by conventional implementations, various ones of the approaches included herein are able to establish and maintain a distributed inode list in such a manner that does not consume otherwise usable storage space, e.g., as will be described in further detail below.

Figure 4A:
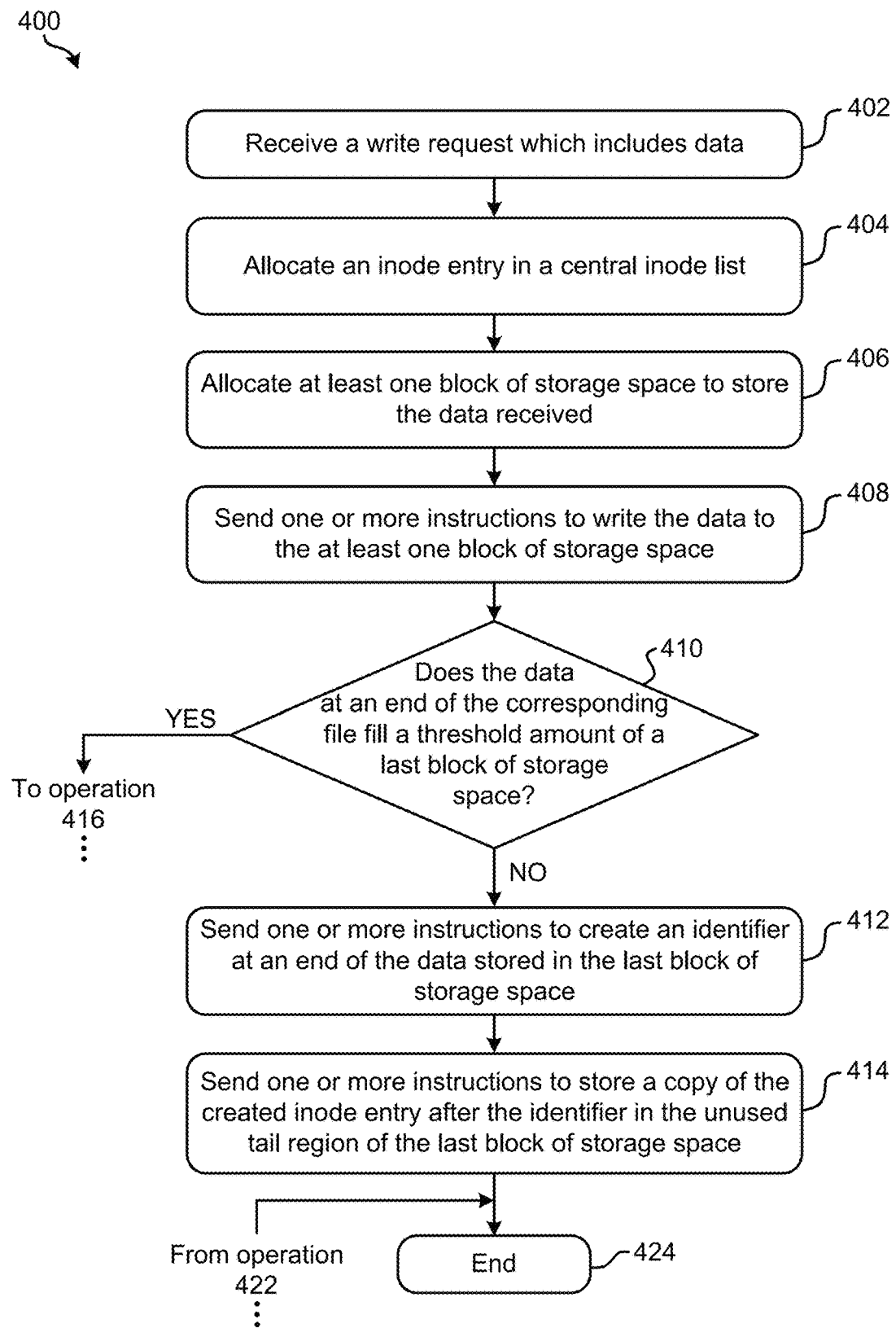
FIG. 4A is a flowchart of a method in accordance with one embodiment.
Figure 4A:
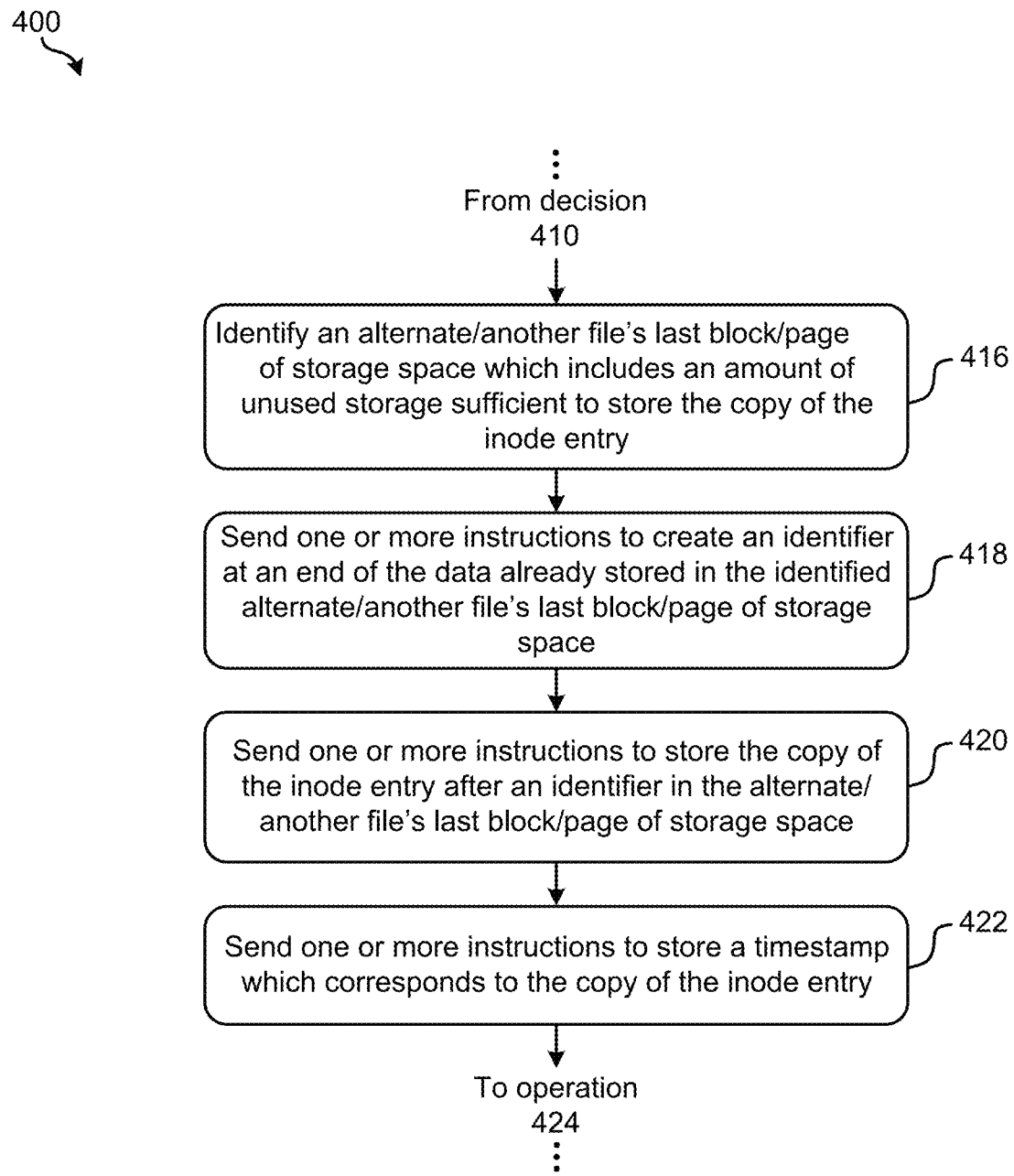

Referring now to FIG. 4A, a flowchart of a method 400 for creating a distributed inode list which does not consume any otherwise usable storage space is shown according to one embodiment. The method 400 may be performed in accordance with the present invention in any of the environments depicted in FIGS. 1-3, among others, in various approaches. Of course, more or less operations than those specifically described in FIG. 4A may be included in method 400, as would be understood by one of skill in the art upon reading the present descriptions. Moreover, some or all of the operations of the method 400 may be combined with some or all operations of the other figures, e.g., FIGS. 4B-5, in any combination in various embodiments.

Each of the steps of the method 400 may be performed by any suitable component of the operating environment. For example, in various approaches, the method 400 may be partially or entirely performed by a controller, a processor, a computer, etc., or some other device having one or more processors therein. Furthermore, the controller, processor, computer, etc., used to perform various ones of the processes in method 400 is electrically coupled to a memory in preferred approaches. Thus, in some approaches, method 400 is a computer-implemented method. Moreover, the terms computer, processor and controller may be used interchangeably with regards to any of the approaches herein, such components being considered equivalents in the many various permutations of the present invention.

Moreover, for those approaches having a processor, the processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4A, operation 402 of method 400 includes receiving a write request which includes data. The data included in the write request typically corresponds to a specific file (e.g., unique grouping of data). Accordingly, operation 404 includes allocating an inode entry in a central inode list correlated with the file which corresponds to the data included in the write request. As previously mentioned, a central inode list is used to store metadata which describes each of the blocks of storage space in memory, including the location of each of the blocks in the persistent storage space, as well as the LBAs corresponding thereto in some approaches. It follows that each file has an inode entry corresponding thereto, which is stored in the central inode list. However, it should be noted that in some approaches the write request received in operation 402 corresponds to an already existing file. Thus, operation 404 may simply include updating an already existing inode entry in the central inode list in some approaches.

Moreover, the process of allocating (e.g., "creating") inodes, and even if they are even allocated in the first case, depends on the specific file system. For instance, some file systems (e.g., ext3) create all of inode entries when the file system is created, thereby resulting in a fixed number of inodes. As a result, in some approaches the file system has a fixed number of files that can be stored therein.

According to some approaches, which are in no way intended to limit the invention, the central inode list is stored in a designated storage location of the main memory. As mentioned above, the inode list is pre-allocated in some approaches such that the process of allocating an inode entry in a central inode list is actually performed by selecting an unused inode entry from the pre-allocated array of available entries and marking it as being used. Accordingly, each inode entry is locked from being reused, overwritten, taken, etc. by other operations.

The metadata which is included in each of the inode entries in the central inode list varies depending on the given approach. For instance, in some approaches each of the entries in a central inode list include metadata which specifies the last time the respective file was accessed, the last time the respective file was modified, the size of the respective file, the name of the respective file, etc., or any other desired metadata.

The data included in the received write request makes up a full file and/or a portion thereof depending on the approach. Accordingly, operation 406 further includes allocating at least one block of storage space to store the data (e.g., file) received. As mentioned above, the controller, processor, computer, etc., used to perform various ones of the processes in method 400 is electrically coupled to a memory in some approaches. With respect to the present description, the "memory" is intended to refer to the persistent storage space of any type of data storage medium, e.g., such as SSD, HDD, Flash, etc. Accordingly, the memory includes multiple blocks of storage space, each of which has an about equal data storage capacity.

The number of blocks of storage space allocated in operation 406 depends on the amount of data received in the write request (e.g., a size of the file) and/or whether a Redundant Array of Independent Disks (RAID) scheme is implemented. For example, more than one block of storage space is allocated in operation 406 if the amount of data received is greater than the storage capacity of a single block of storage space. According to another example, a RAID scheme identifying a specific distribution of the data may specify that more than one block of storage space be used to store the data, irrespective of the storage capacity the blocks may have.

In addition to allocating an inode entry and storing metadata, the data itself is actually stored in the one or more blocks of storage space. Accordingly, operation 408 includes sending one or more instructions to write the data to the at least one block of storage space. According to some approaches, the write instructions are sent to an existing file, e.g., such that one or more of the blocks storing the data thereof are overwritten.

Depending on the processing device used to perform the various processes of method 400 and/or the implementation of this processing device, operation 408 may include sending the one or more instructions to different locations. For example, in some approaches the various processes of method 400 are performed by a central controller. Accordingly, the central controller may send the one or more instructions to write the data to the at least one block of storage space to a storage controller. However, in other approaches method 400 is performed by a storage controller, in which case the one or more instructions to write the data to the at least one block of storage space are sent directly to a writing component of the memory, e.g., such as a magnetic read/write head of an HDD, a memory I/O unit of a Flash-based SSD, etc.

With continued reference to FIG. 4A, decision 410 includes determining whether the data at an end of the corresponding file fills a threshold amount of a last block of storage space allocated to store the data. In other words, decision 410 includes determining whether a last one of the pages included in a last block of storage space allocated to store the given file has been filled to, or above, a threshold as a result of the data being written thereto. In a filesystem, each file is allocated to chunks of blocks, these chunks also being referred to as pages. However, the granularity of the pages with respect to the files typically prevents each of the various blocks from being filled entirely. In other words, the process of adding a file to a filesystem rarely produces one or more blocks which are filled to their capacity. It follows that in many situations, the final page and/or the final block of storage space used to store the data corresponding to a given file has a "tail" region of unused storage space which follows an end of the data stored therein. Moreover, this unused storage space in the tail region of the last block found at the end of a given file are preferably used in various ones of the embodiments herein to store metadata (e.g., such as a copy of the corresponding inode entry), thereby improving resourcefulness and robustness of the storage system without sacrificing storage capacity.

According to preferred approaches, the threshold is set such that a last block storing an amount of data which is at or below the threshold has a remaining amount of available storage space which is sufficient to store a copy of an inode entry therein. It follows that the threshold may be predetermined, set by a user, updated in real time, etc., depending on the desired approach. Moreover, the threshold may be represented as a percentage of the block's storage capacity (e.g., 80%, 85%, 90%, 93%, etc), a specified amount of data, etc., depending on the approach. It should also be noted that "fills a threshold" is in no way intended to limit the invention. Rather than determining whether the data in a given block fills a threshold amount of the storage space included therein, equivalent determinations may be made, e.g., as to whether the amount of data in the given block is within a predetermined range, outside a predetermined range, below a threshold, etc., depending on the desired approach.

According to a specific example, which is in no way intended to limit the invention, decision 410 is performed by determining whether the amount of data (e.g., size of the file) received in operation 402 is less than the size of one of the blocks multiplied by the number of blocks allocated for the corresponding file. In other words, decision 410 is performed in some approaches by determining whether the amount of data being stored in the one or more allocated blocks is less than the combined storage capacity of the one or more allocated blocks.

It follows that determining the data does not fill a threshold amount of a last block at an end of the file indicates the given block has a tail region of unused storage space which begins at an end of the data that is stored therein. Thus, method 400 proceeds to operation 412 in response to determining that the data does not fill a threshold amount of the last allocated block of storage space. There, operation 412 includes sending one or more instructions to create an identifier at an end of the data stored in the last block of storage space. This identifier (which is also referred to herein as a "magic string") serves as a way of clearly indicating an end of the data (and an end of the file itself) stored in the block, even in disaster situations where the central inode list is inaccessible, e.g., as will be described in further detail below. Thus, the identifier preferably includes a unique string of logical "1s" and "0s" which are easily distinguishable from a remainder of the data stored in the memory.

Furthermore, operation 414 includes sending one or more instructions to store a copy of the inode entry allocated (or updated) in operation 404, after the identifier in the unused tail region of the last block of storage space. The identifier (e.g., magic string) thereby serves as a boundary separating the data from the copy of the inode entry in the final block of storage space. Moreover, implementing the identifier causes a beginning of the inode entry to be easily identifiable and therefore distinguishable from the data, e.g., as mentioned above.

Again, the inode entry copies stored in the tail regions of blocks throughout memory serve as a distributed backup of the central inode list in preferred approaches. The metadata included in each of these inode entry copies is therefore used in some approaches to reconstruct the central inode list, or at least a portion thereof, e.g., in situations where the central inode list is lost or otherwise inaccessible. However, the amount of unused storage space available in each of the blocks is limited in some cases. Thus, in order to increase the number files having a last block with an adequate amount of unused storage space to store an identifier and a corresponding copy of an inode entry, the storage footprint of each of the inode entry copies may be reduced. This reduced footprint is achieved in some approaches by decreasing the amount of metadata included in the copy of an inode entry with respect to the amount of metadata included in the inode entry itself. In other words, the metadata included in the copy of an inode entry is reduced in some approaches to only include the metadata which would be used in reconstructing a central inode list.

For instance, superfluous portions of the metadata in a given inode list entry, e.g., such as metadata which indicates the last time a corresponding file was accessed, the last time a corresponding file was modified, permission information, etc., may be selectively removed when forming the copy of the given inode list entry. According to an example, which is in no way intended to limit the invention, the copy of the given inode list entry may only include the head of the corresponding metadata list. Accordingly, the indirect blocks are not replicated, but rather rely on being sufficiently distributed across the storage space, and as such, are not likely to be lost like the central inode-list. In some approaches, the metadata which is actually included in each of these condensed inode entry copies may be predetermined, specified by a user, adjusted based on the amount of unused storage space in a corresponding block, etc. Certain metadata may actually be added to each of the copies of the inode list entries, e.g., such as a user-readable name of the corresponding file, e.g., as would be appreciated by one skilled in the art after reading the present description.

As alluded to above, the tail region of unused storage space in a block is otherwise not utilized during the data storage process. Thus, storing copies of inode entries in these tail regions as described herein has no detrimental impact on the overall storage capacity of the memory.

Furthermore, these tail regions of unused storage space are spread across the memory in a distributed manner. Thus, the inode entry copies stored therein are also distributed across memory in a manner which increases overall retention. Even in the event that the central inode list becomes inaccessible, the approaches included herein remain resistant to a total loss of the information included in the inode list. For example, while some blocks of storage space in memory may fail or otherwise become inaccessible, the inode entry copies included therein are only a small portion of the total number of inode entry copies which are distributed across the various blocks of storage space.

As a result, the storage architecture achieved as a result of implementing method 400 is able to maintain a distributed copy of the central inode list which is resilient and which does not consume otherwise usable storage space. In other words, the various improvements achieved by the various approaches herein come at no storage cost which is significantly desirable.

It should also be noted that although operation 414 is illustrated in FIG. 4A as being performed following operation 404, in other approaches the copy of an inode entry may be stored in a block of storage space before a corresponding entry is allocated (e.g., created) in the central inode list.

Returning to decision 410, method 400 proceeds to operation 416 in response to determining that the data does fill a threshold amount of the last block of storage space. In other words, method 400 proceeds to operation 416 in response to determining that the last block of storage space allocated to store the data of a file is filled to a point that an identifier and/or a copy of an inode entry is unable to be stored therein. Looking to operation 416, an alternate/another last block/page of storage space at an end of another file which includes an amount of unused storage sufficient to store the copy of the inode entry is identified. With respect to the present description, the alternate/another file's last block/page of storage space is one which has enough vacant (unused) space to host more than its own meta data, and thereby serve as a repository for other copies of inode entries. In other words, although the last block used to store the data in a file is filled at or past a threshold capacity, another "last block" at an end of a different file may have a sufficient amount of unused storage space to store the copy of the inode entry in some approaches. For example, the block of storage space at an end of a file previously stored in memory includes an amount of unused storage space (e.g., a tail region) which is able to store the copy of the inode entry. In some approaches, this alternate/another file's last block/page of storage space is used to store an additional copy of the inode entry which corresponds to an important file which may be unable to accommodate its own meta-data in the tail region thereof, e.g., as will be described in further detail below.

This alternate last file block/page of storage space is identified in some approaches by simply comparing an amount of data included in the copy of the inode entry with the amount of unused storage space in the last block of various other files. Moreover, a last block having a greatest amount of unused storage space, having an amount of unused storage space which most closely matches the size of the amount of data included in the copy of the inode entry, which does not already include a copy of an inode entry stored therein, etc. may be identified (e.g., selected) as the alternate last file block/page in operation 416. It follows that the location, contents, configuration, etc. of the alternate last file block/page of storage space varies depending on the approach.

Moreover, operation 418 includes sending one or more instructions to create an identifier (e.g., magic string) at an end of the data already stored in the identified alternate last file block/page of storage space. However, in some approaches the alternate last file block/page of storage space may already have an identifier included therein. According to one example, the alternate last file block/page of storage space identified in operation 416 already includes an identifier as well as a copy of another inode entry stored therein. Accordingly, operation 418 is skipped over (not performed) in some approaches.

Moving to operation 420, method 400 includes sending one or more instructions to store the copy of the inode entry after an identifier in the alternate last file block/page of storage space. Any of the approaches described above with respect to operation 414 may be implemented in order to perform operation 420. Accordingly, the previously mentioned improvements are also achieved as a result of storing the copy of the inode entry in an alternate last file block/page of storage space.

Furthermore, optional operation 422 includes sending one or more instructions to store a timestamp which corresponds to the copy of the inode entry. Approaches in which a tail region at the end of a file is able to store the inode information of more than one different file utilize timestamps in order to distinguish between the different inode entry copies. For instance, more than one copy of the same inode information can be stored in different blocks of storage space in some approaches. Thus, a timestamp is used to determine which of the copies is most recent and therefore provides a most accurate representation of the corresponding inode entry. Again, timestamps are relevant if tails of other files can store the inode information of multiple files. Accordingly, operation 422 is not performed in some approaches.

However, it should be noted that in some approaches, a copy of a given inode entry for a file is not implemented in any of the blocks of storage space in response to determining that the block of storage space which corresponds to the given inode entry is filled to or above a threshold amount. The process of storing the copy of an inode entry in an alternate last file block/page of storage space causes the number of blocks allocated for the file to increase by one, which is in turn reflected in the central inode list. Thus, in order to avoid any impact on the central inode list, operations 416, 418, 420 and 422 are not performed and the copy of the inode entry is not added in an alternate last file block/page of storage space in some approaches, e.g., as would be appreciated by one skilled in the art after reading the present description.

Figure 4B:
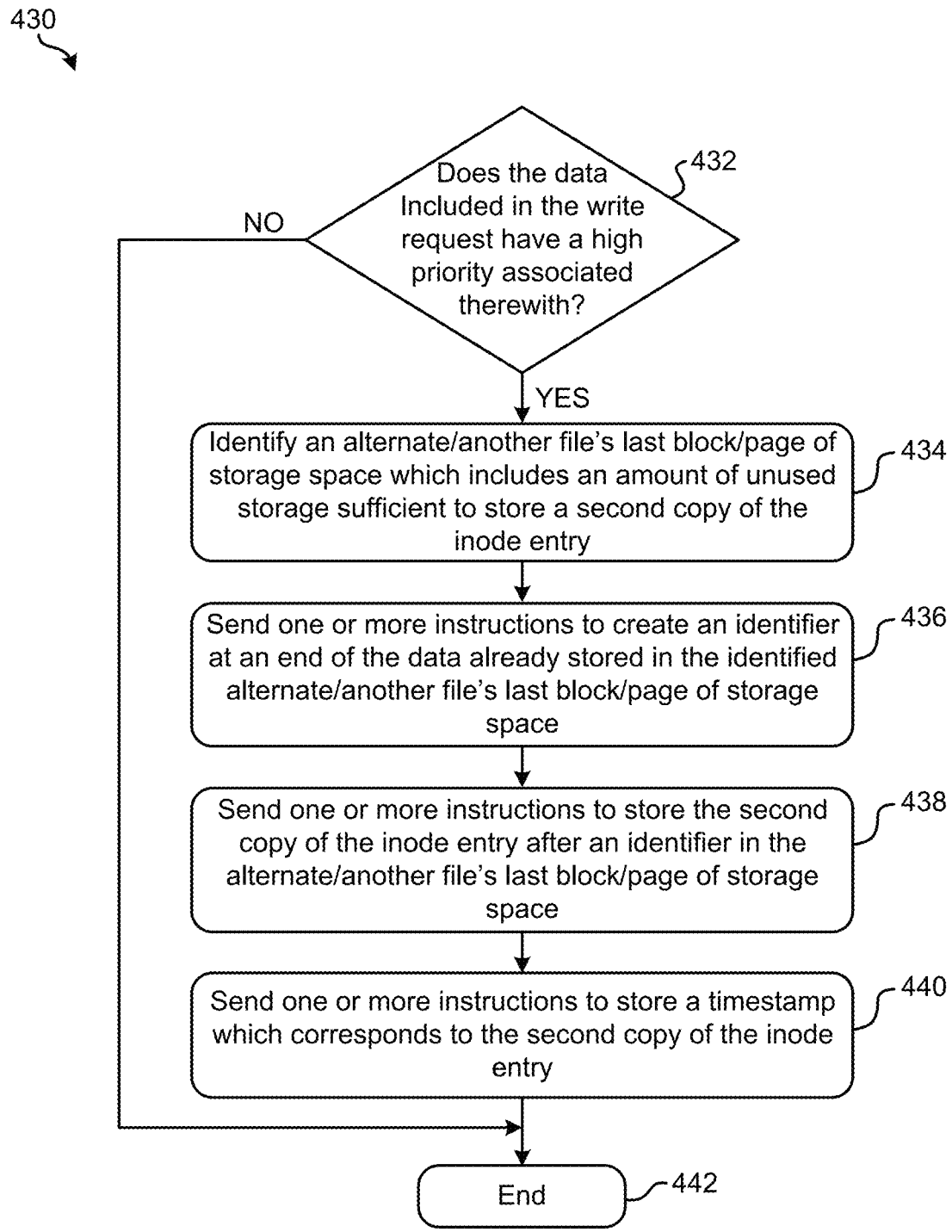
FIG. 4B is a flowchart of a method in accordance with another embodiment.

Referring still to FIG. 4A, method 400 is illustrated as proceeding to operation 424 from both operation 414 as well as operation 422. Upon reaching operation 424, method 400 ends in some approaches. However, it should be noted that although method 400 may end upon reaching operation 424, any one or more of the processes included in method 400 may be repeated in order to process subsequently received write requests. However, in other approaches method 400 includes performing additional processes which correspond to different circumstances, some of which may arise during implementation. For instance, looking to FIG. 4B, processes of a method 430 which may be used to supplement method 400 are illustrated in accordance with an exemplary approach, one or more of which may be implemented following the performance of operation 414 and/or operation 422, e.g., rather than proceeding to operation 424 and ending method 400. However, it should be noted that the supplemental processes of FIG. 4B are illustrated in accordance with one embodiment which is in no way intended to limit the invention.

As shown, decision 432 involves determining whether the data included in the write request received in operation 402 has a high priority associated therewith. Sometimes specific data (e.g., files) is of particular importance to a user, the successful operation of a filesystem, a given application, etc. The importance of such data is identified in some approaches by assigning a priority to the data, such that it may be distinguished from other data having less importance. The priority assigned to different data may further be distinguished by incorporating different priority levels. For example, data having a medium priority may be more important than data having a low priority, but less important than data having a high priority.

It is desirable in some approaches that data having a sufficiently high priority is afforded additional data retention measures. In other words, data which has a high priority is given added protection to avoid loss as a result of a disaster situation, unintended erasure, memory failure, etc. For example, a second copy of the data determined as having a high priority may be stored for added redundancy. Thus, in response to determining that the data included in the received write request has a high priority associated therewith, method 400 proceeds to operation 434. There, operation 434 includes identifying an alternate last file block/page of storage space at an end of another file which includes an amount of unused storage sufficient to store a second copy of the inode entry. As mentioned above, the "last block" at an end of other files may have a sufficient amount of unused storage space to store the copy of an inode entry which corresponds to a different file than that which the data stored therein represents. For example, the block of storage space at an end of a file previously stored in memory includes an amount of unused storage space (e.g., a tail region) which is able to store a second copy of the inode entry.

Upon being implemented in memory, this second copy of the inode entry serves as a backup to the other copy previously stored in the tail region of another last block of storage space. Thus, even if the central inode list as well as one of the copies of the inode entry are lost, the other remaining copy of the inode entry may be used to reconstruct the corresponding inode entry.

Operation 436 further includes sending one or more instructions to create an identifier (e.g., magic string) at an end of the data already stored in the alternate last block of storage space identified in operation 434. As mentioned above, in some approaches the identified alternate last file block/page of storage space may already have an identifier included therein. According to one example, the alternate last file block/page of storage space identified in operation 434 already includes an identifier and possibly a copy of another inode entry stored therein. Accordingly, operation 436 is skipped over (not performed) in some approaches.

Method 400 further includes sending one or more instructions to store the second copy of the inode entry after an identifier in the alternate last block of storage space. See operation 438. In some approaches, the second copy of the inode entry may include the same metadata as the first copy of the inode entry. Accordingly, the second copy is a condensed version of the entry in the central inode list. However, in other approaches the second copy of the inode entry may include more or less metadata than the first copy of the inode entry, e.g., depending on an amount of available storage space in the tail region of the identified block.

Further still, operation 440 includes sending one or more instructions to store a timestamp which corresponds to the second copy of the inode entry. As mentioned above, timestamps are used in some situations to distinguish between more than one copy of the same inode list entry. Accordingly, any of the approaches described above with respect to operation 422 may be implemented in order to perform operation 440, e.g., as would be appreciated by one skilled in the art after reading the present description.

From operation 440, the flowchart of FIG. 4B proceeds to operation 442, whereby method 430 may end. Similarly, method 430 jumps to operation 442 from decision 432 in response to determining that the data included in the received write request does not have a high priority associated therewith. However, it should be noted that although method 430 may end upon reaching operation 442, any one or more of the processes included in method 430 may be repeated in order to determine whether additional write requests include data having a high priority.

Over time the data included in files of a filesystem, as well as the relationships which exist between the files, change as new write requests, delete requests, file updates, etc., are performed by the filesystem. Accordingly, the central inode list is updated over time as well. Copies of the entries in the central inode list are also preferably updated in a timely fashion such that they reflect changes in size of the various files stored in memory, and provide a viable representation of the central inode list. For instance, looking to FIG. 4C, processes of a method 450 which may be used to supplement method 400 and/or method 430 are illustrated in accordance with an exemplary approach. The various processes in method 450 are implemented in the background in preferred approaches, e.g., such that they may be implemented at any point during operation of method 400 without affecting performance thereof. However, it should be noted that the supplemental processes of FIG. 4C are illustrated in accordance with one embodiment which is in no way intended to limit the invention.

As shown, operation 452 involves monitoring a frequency at which the data that corresponds to the entries in the central inode list is updated. In some approaches, the update frequency of a given grouping of data (e.g., file) is determined using a temperature of the data. With respect to the present description, the "temperature" or "heat" of data refers to the rate (e.g., frequency) at which the data is updated (e.g., rewritten with new data). Blocks of storage space considered as having a high temperature or as being hot tend to have a frequent updated rate, while memory blocks that have a low temperature or which are considered as being cold have a slower update rate, at least with respect to the update rate of hot blocks. Decision 454 further includes using the frequency at which the data is updated to determine whether to update the copy of the inode entry. In some approaches, the determination made in decision 454 uses information which corresponds to a last time a given copy of an inode entry was updated, e.g., to determine whether updating the copy of the inode entry is desired.

In response to determining that the copy of the inode entry should be updated, method 450 proceeds to operation 456 which includes sending one or more instructions to update the copy of the inode entry. The process of updating the copy of the inode entry may include performing any of the same or similar operations as those implemented to originally create the copy of the inode entry. Accordingly, any of the approaches described above in correlation with operation 414 may be implemented to update the copy of the inode entry, e.g., as would be appreciated by one skilled in the art after reading the present description.

Figure 4C:
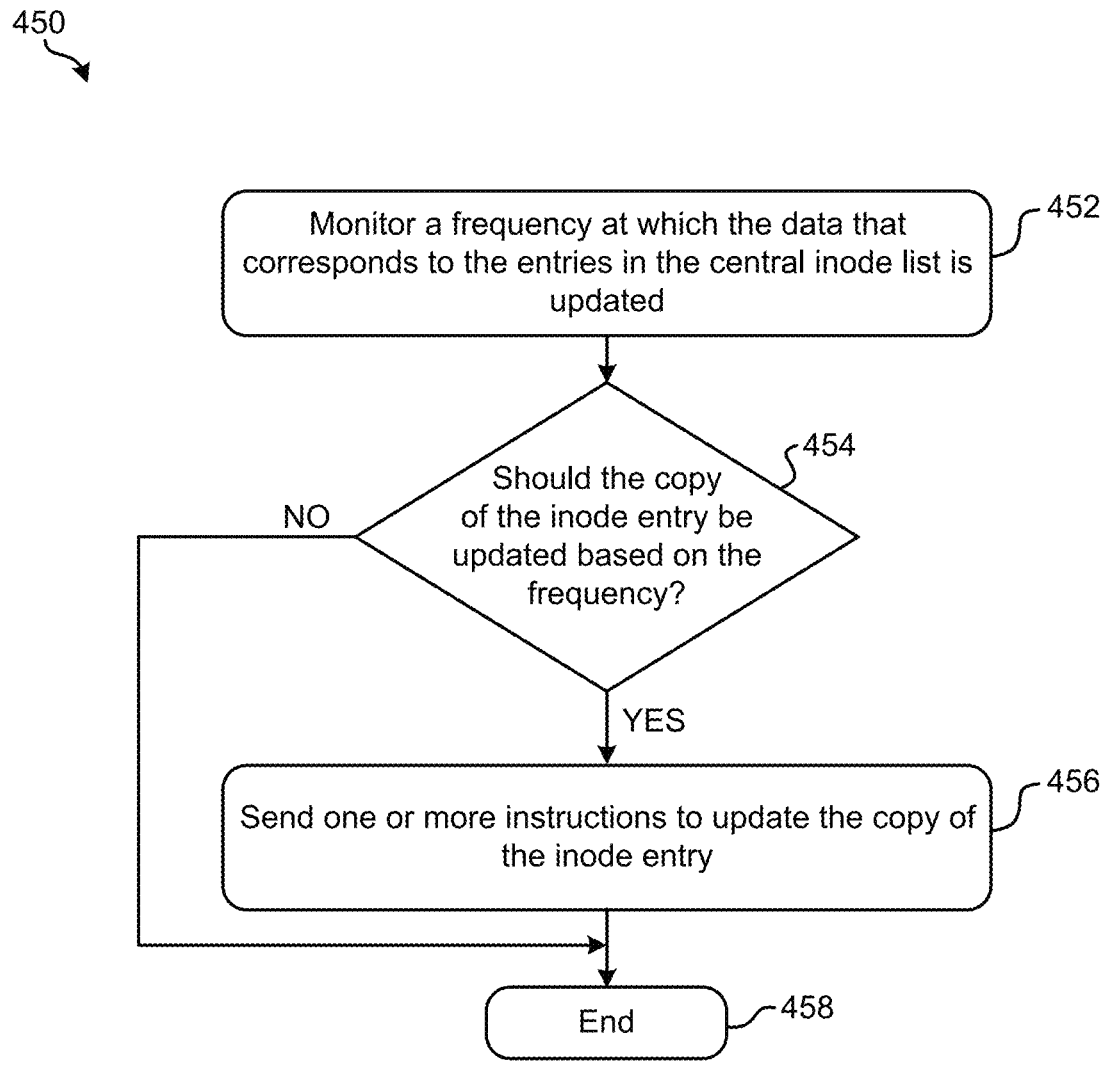
FIG. 4C is a flowchart of a method in accordance with another embodiment.

From operation 456, the flowchart of FIG. 4C proceeds to operation 458, whereby method 450 may end. Similarly, method 450 jumps to operation 458 from decision 454 in response to determining that the copy of the inode entry should not be updated. However, it should be noted that although method 450 may end upon reaching operation 458, any one or more of the processes included in method 450 may be repeated in order to determine whether additional inode entry copies should be updated.

As mentioned above, a loss of the central inode list undesirably causes the entire filesystem to essentially become useless, as there is no way of identifying where each file begins, much less where each of the various blocks that belong to that file reside throughout the memory. In other words, without the central inode list, the information stored in memory essentially becomes an indecipherable string of logical "1s" and "0s". Accordingly, the distributed copies of the entries in the central inode list as described in the various approaches herein may be used to reconstruct the central inode list, e.g., after becoming inaccessible. Moreover, the manner in which the distributed copies of the inode list entries are implemented does not consume otherwise usable storage space, and therefore has no detrimental impact on storage capacity which has not been conventionally achievable.

Figure 5:
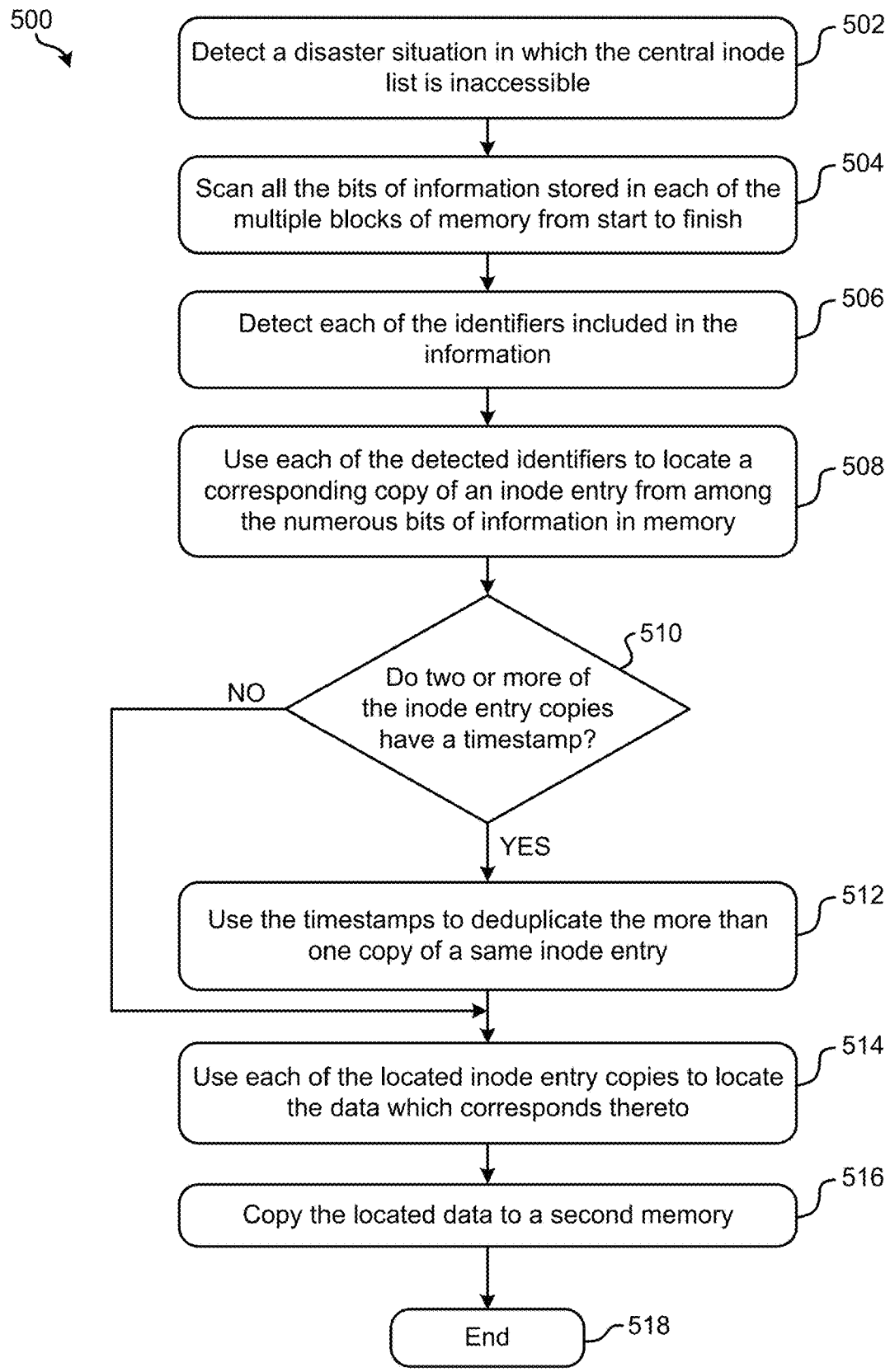
FIG. 5 is a flowchart of a method in accordance with another embodiment.

Looking now to FIG. 5, a method 500 for reconstructing a central inode list and filesystem is illustrated in accordance with one embodiment. The method 500 may be performed in accordance with the present invention in any of the environments depicted in FIGS. 1-4C, among others, in various approaches. For example, method 500 may be running in the background (e.g., unbeknownst to a user) such that various ones of the processes included in method 500 are performed in response to experiencing a disaster situation in order to successfully recover the central inode list. Of course, more or less operations than those specifically described in FIG. 5 may be included in method 500, as would be understood by one of skill in the art upon reading the present descriptions. Moreover, some or all of the operations of the method 500 may be combined with some or all operations of the other figures, e.g., FIGS. 4A-4C, in any combination in various embodiments.

Each of the steps of the method 500 may be performed by any suitable component of the operating environment. For example, in various approaches, the method 500 may be partially or entirely performed by a controller, a processor, a computer, etc., or some other device having one or more processors therein. Furthermore, the controller, processor, computer, etc., used to perform various ones of the processes in method 500 is electrically coupled to a memory in preferred approaches. Thus, in some approaches, method 500 is a computer-implemented method. Moreover, the terms computer, processor and controller may be used interchangeably with regards to any of the approaches herein, such components being considered equivalents in the many various permutations of the present invention.

Moreover, for those approaches having a processor, the processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, operation 502 of method 500 includes detecting a disaster situation in which the central inode list is inaccessible (e.g., unrecoverable). Moreover, operation 504 includes scanning all the bits of information stored in each of the multiple blocks of memory from start to finish. In other words, a data storage component (e.g., magnetic read head, memory I/O unit, etc.) which is able to read bits of information from the physical medium on which the blocks of data are stored, reads each of the bits stored on the physical medium. According to some approaches, the "start" corresponds to data stored in a first physical storage location, while the "finish" corresponds to data stored in a last physical storage location. In one example, which is in no way intended to limit the invention, the "start" corresponds to data stored in a first block of an outermost track on a disk, while the "finish" corresponds to data stored in a last block of an innermost track on the disk. In other approaches, the "start" corresponds to data stored in a first logical position (e.g., LBA), while the "finish" corresponds to data stored in a last logical position.

While scanning all the bits of information stored in each of the multiple blocks of memory from start to finish, the data storage component is preferably searching for the various identifiers (e.g., magic strings) scattered among the bits of information. As mentioned above, each of the identifiers are preferably constructed such that they are easily identifiable and therefore distinguishable from the remainder of the bits of information. Accordingly, operation 506 includes detecting each of the identifiers included in the information. Moreover, each of the detected identifiers are used to locate a corresponding copy of an inode entry from among the numerous bits of information in memory. See operation 508.

It follows that the metadata included in each of the located inode entry copies can be used to reconstruct the central inode list using any processes which would be apparent to one skilled in the art after reading the present description. In some approaches the metadata is duplicated from each of the located inode entry copies and used to construct a new version of the central inode list. In other approaches, the metadata extracted from the located inode entry copies is used to rebuild (e.g., repair) the inaccessible central inode list. Moreover, the central inode list may be reconstructed in the same or different memory as the inaccessible central inode list.

However, more than one copy of a given inode entry may exist in the information. As mentioned above, certain circumstances may trigger the storage of more than one copy of the same inode entry in the tail regions of the blocks. For example, at least two copies of an inode entry corresponding to data determined as having a high priority associated therewith is stored in different blocks of storage space at the end of the respective files. Accordingly, a most updated and accurate one of the multiple copies of the same inode entry is preferably used to locate the data which corresponds thereto. Looking to decision 510, a determination is first made as to whether any two or more of the located inode entry copies have timestamps corresponding thereto. The presence of more than one inode entry copy with a timestamp corresponding thereto indicates that more than one copy of the same inode entry was created.

Accordingly, method 500 proceeds to operation 512 in response to determining that two or more of the located inode entry copies do have timestamps corresponding thereto. There, operation 512 includes using the timestamps to deduplicate the more than one copy of a same inode entry. In one approach, the deduplication process involves identifying the most recent (e.g., up-to-date) timestamp and disregarding the remaining timestamps. Moreover, the inode entry copy corresponding to the timestamp identified as being the most recent is further used to locate data, e.g., as will soon become apparent.

Again, the copies of the inode entries can also be used to reconstruct the general body of the filesystem altogether. Accordingly, each of the located inode entry copies are used to locate the data which corresponds thereto. See operation 514. In other words, each of the inode entry copies are used to identify the data included in the block or file which corresponds to the given copy of the inode entry. According to some approaches, each of the located inode entry copies are extracted from the remainder of the information stored in the memory and the metadata included there is examined in order to locate the data (e.g., file or portion of a file) which corresponds thereto. This may be accomplished regardless of whether the inode entry copy has direct access to the corresponding block of storage space (e.g., direct block), or an indirect relationship (indirect block). Moreover, the data which corresponds to a given inode entry copy may be identified differently depending on the approach. For instance, in some approaches the data which corresponds to a given inode entry copy is identified by determining the LBA which corresponds thereto, which in turn may be used to locate the specific data or block in which the data is stored.

Operation 516 further includes copying the located data to a second memory. According to the present description, "second memory" is in no way intended to be limiting and may include a separate storage drive, a different tier of a multi-tiered data storage system, a different physical storage location (e.g., a different track on a magnetic disk), etc., which is removed from the one in which the failed central inode list and corresponding data is located. In some approaches the second memory may be selected such that it is the same or similar type of memory as the data's previous storage location. In other approaches, the second memory may be selected such that it is a different type of memory than the data's previous storage location.

Upon copying all of the located data to the second memory and establishing a new central inode list, the filesystem may transfer to the second memory in the background. As a result, a user will regain access to the filesystem and the data stored thereon, e.g., such that normal storage operations may resume. Thus, even in situations in which the central inode list is lost, operation of the filesystem is maintained by the various processes included in method 500 which are able to replicate the lost inode list and the filesystem itself. Again, this is made possible by implementing and maintaining a distributed copy of the central inode list in such a way that does not consume storage space which is otherwise usable. Thus, by scanning the memory (e.g., disk, LUN, volume, etc.) from start to finish, the magic strings are easily identifiable. Moreover, each of these magic strings identifies a copy of an inode entry which is able to assist in recovering a specific file, thereby allowing for all data to be recovered onto another filesystem. Furthermore, this is achievable regardless of whether a redundant backup of the central inode list already exists elsewhere in storage and/or how recently such a backup has been updated.

From operation 516, the flowchart of FIG. 5 proceeds to operation 518, whereby method 500 may end. However, it should be noted that although method 500 may end upon reaching operation 518, any one or more of the processes included in method 500 may be repeated in order to react to additional disaster situations.

It follows that various ones of the approaches described herein are desirably able to replicate entries in the central inode list such that no otherwise usable storage space is consumed in doing so. This is achieved by storing a copy of an inode entry in the tail region of the block of storage space found at the end of the corresponding file. Again, the tail regions of unused storage space in various blocks at the end of files are otherwise not utilized during the data storage process. Thus, storing copies of inode entries in these tail regions has no detrimental impact on the overall storage capacity of the memory.

The magic string structures can also be searched for in the event of a data loss (e.g., disaster) situation where the central inode list is lost, thereby also minimizing the resulting write amplification. Distributing these inode entry copies across the various blocks of storage space also desirably reduces the exposure to a total data loss. Even in the event that the central inode list becomes inaccessible, the approaches included herein remain resistant to a total loss of the information included in the inode list. For example, while some blocks of storage space in memory may fail or otherwise become inaccessible, the inode entry copies included therein are only a small portion of the total number of inode entry copies which are distributed across the various blocks of storage space. Moreover, even if all copies of a given inode entry and/or the corresponding indirect block is lost, only the respective file is lost rather than all files in the filesystem as would be experienced in conventional implementations.

Again, the storage architectures achieved by the various approaches included herein are able to maintain a distributed copy of the central inode list which is resilient and which does not consume otherwise usable storage space. In other words, the various improvements achieved by the various approaches herein come at no storage cost which is significantly desirable, particularly in view of the shortcomings experienced by conventional implementations.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   receiving a write request which includes data;
   allocating an inode entry in a central inode list, wherein the inode entry corresponds to the data;
   allocating the data to a block of storage space in memory, wherein the memory includes multiple blocks of storage space;
   sending one or more instructions to write the data to the block of storage space;
   determining whether the data fills a threshold amount of a last block of storage space;
   sending one or more instructions to create an identifier at an end of the data in response to determining that the data does not fill the threshold amount of the last block of storage space; and
   sending one or more instructions to store a copy of the inode entry after the identifier in the last block of storage space.

2. The computer-implemented method of claim 1, wherein the copy of the inode entry includes less metadata than the inode entry.

3. The computer-implemented method of claim 1, comprising:
   identifying an alternate last block of storage space which includes a sufficient amount of unused storage in response to determining that the data fills the threshold amount of the last block of storage space;
   sending one or more instructions to store the copy of the inode entry after an identifier in the alternate last block of storage space; and
   sending one or more instructions to store a timestamp which corresponds to the copy of the inode entry.

4. The computer-implemented method of claim 1, comprising:
   determining whether the data has a high priority associated therewith;
   identifying an alternate last block of storage space which includes a sufficient amount of unused storage in response to determining that the data has a high priority associated therewith;
   sending one or more instructions to store a second copy of the inode entry after an identifier in the alternate last block of storage space; and
   sending one or more instructions to store a timestamp which corresponds to the second copy of the inode entry.

5. The computer-implemented method of claim 1, comprising:
   monitoring a frequency at which the data is updated; and
   determining whether to update the copy of the inode entry based on the frequency at which the data is updated.

6. The computer-implemented method of claim 1, comprising:
   detecting a disaster situation in which the central inode list is inaccessible;
   scanning information stored in each of the multiple blocks of storage space;
   detecting each identifier included in the information;
   using each of the detected identifiers to locate a corresponding copy of an inode entry;
   using each of the located inode entry copies to locate data which corresponds thereto; and
   copying the located data to a second memory.

7. The computer-implemented method of claim 6, comprising:
   determining whether two or more of the located inode entry copies have a timestamp corresponding thereto; and
   using the timestamps to deduplicate copies of a same inode entry in response to determining that two or more of the located inode entry copies have a timestamp corresponding thereto.

8. A computer program product comprising a computer readable storage medium having program instructions embodied therewith, wherein the computer readable storage medium is not a transitory signal per se, the program instructions readable and/or executable by a processor to cause the processor to perform a method comprising:
   receiving, by the processor, a write request which includes data;
   allocating, by the processor, an inode entry in a central inode list, wherein the inode entry corresponds to the data;
   allocating, by the processor, the data to a block of storage space in memory, wherein the memory includes multiple blocks of storage space;
   sending, by the processor, one or more instructions to write the data to the block of storage space;
   determining, by the processor, whether the data fills a threshold amount of a last block of storage space;
   sending, by the processor, one or more instructions to create an identifier at an end of the data in response to determining that the data does not fill the threshold amount of the last block of storage space; and
   sending, by the processor, one or more instructions to store a copy of the inode entry after the identifier in the last block of storage space.

9. The computer program product of claim 8, wherein the copy of the inode entry includes less metadata than the inode entry.

10. The computer program product of claim 8, the program instructions readable and/or executable by the processor to cause the processor to perform the method comprising:
    identifying, by the processor, an alternate last block of storage space which includes a sufficient amount of unused storage in response to determining that the data fills the threshold amount of the last block of storage space;
    sending, by the processor, one or more instructions to store the copy of the inode entry after an identifier in the alternate last block of storage space; and
    sending, by the processor, one or more instructions to store a timestamp which corresponds to the copy of the inode entry.

11. The computer program product of claim 8, the program instructions readable and/or executable by the processor to cause the processor to perform the method comprising:
    determining, by the processor, whether the data has a high priority associated therewith;
    identifying, by the processor, an alternate last block of storage space which includes a sufficient amount of unused storage in response to determining that the data has a high priority associated therewith;
    sending, by the processor, one or more instructions to store a second copy of the inode entry after an identifier in the alternate last block of storage space; and sending, by the processor, one or more instructions to store a timestamp which corresponds to the second copy of the inode entry.

12. The computer program product of claim 8, the program instructions readable and/or executable by the processor to cause the processor to perform the method comprising:
monitoring, by the processor, a frequency at which the data is updated; and
determining, by the processor, whether to update the copy of the inode entry based on the frequency at which the data is updated.

13. The computer program product of claim 8, the program instructions readable and/or executable by the processor to cause the processor to perform the method comprising:
detecting, by the processor, a disaster situation in which the central inode list is inaccessible;
scanning, by the processor, information stored in each of the multiple blocks of storage space;
detecting, by the processor, each identifier included in the information;
using, by the processor, each of the detected identifiers to locate a corresponding copy of an inode entry;
using, by the processor, each of the located inode entry copies to locate data which corresponds thereto; and
copying, by the processor, the located data to a second memory.

14. The computer program product of claim 13, the program instructions readable and/or executable by the processor to cause the processor to perform the method comprising:
determining, by the processor, whether two or more of the located inode entry copies have a timestamp corresponding thereto; and
using, by the processor, the timestamps to deduplicate copies of a same inode entry in response to determining that two or more of the located inode entry copies have a timestamp corresponding thereto.

15. A system, comprising:
a processor; and
logic integrated with the processor, executable by the processor, or integrated with and executable by the processor, the logic being configured to:
receive, by the processor, a write request which includes data;
allocate, by the processor, an inode entry in a central inode list, wherein the inode entry corresponds to the data;
allocate, by the processor, the data to a block of storage space in memory, wherein the memory includes multiple blocks of storage space;
send, by the processor, one or more instructions to write the data to the block of storage space;
determine, by the processor, whether the data fills a threshold amount of a last block of storage space;
send, by the processor, one or more instructions to create an identifier at an end of the data in response to determining that the data does not fill the threshold amount of the last block of storage space; and
send, by the processor, one or more instructions to store a copy of the inode entry after the identifier in the last block of storage space.

16. The system of claim 15, wherein the copy of the inode entry includes less metadata than the inode entry.

17. The system of claim 15, the logic being configured to:
identify, by the processor, an alternate last block of storage space which includes a sufficient amount of unused storage in response to determining that the data fills the threshold amount of the last block of storage space;
send, by the processor, one or more instructions to store the copy of the inode entry after an identifier in the alternate last block of storage space; and
send, by the processor, one or more instructions to store a timestamp which corresponds to the copy of the inode entry.

18. The system of claim 15, the logic being configured to:
determine, by the processor, whether the data has a high priority associated therewith;
identify, by the processor, an alternate last block of storage space which includes a sufficient amount of unused storage in response to determining that the data has a high priority associated therewith;
send, by the processor, one or more instructions to store a second copy of the inode entry after an identifier in the alternate last block of storage space; and
send, by the processor, one or more instructions to store a timestamp which corresponds to the second copy of the inode entry.

19. The system of claim 15, the logic being configured to:
monitor, by the processor, a frequency at which the data is updated; and
determine, by the processor, whether to update the copy of the inode entry based on the frequency at which the data is updated.

20. The system of claim 15, the logic being configured to:
detect, by the processor, a disaster situation in which the central inode list is inaccessible;
scan, by the processor, information stored in each of the multiple blocks of storage space;
detect, by the processor, each identifier included in the information;
use, by the processor, each of the detected identifiers to locate a corresponding copy of an inode entry;
use, by the processor, each of the located inode entry copies to locate data which corresponds thereto; and
copy, by the processor, the located data to a second memory.

21. The system of claim 20, the logic being configured to:
determine, by the processor, whether two or more of the located inode entry copies have a timestamp corresponding thereto; and
use, by the processor, the timestamps to deduplicate copies of a same inode entry in response to determining that two or more of the located inode entry copies have a timestamp corresponding thereto.

22. A computer program product comprising a computer readable storage medium having program instructions embodied therewith, wherein the computer readable storage medium is not a transitory signal per se, the program instructions readable and/or executable by a processor to cause the processor to perform a method comprising:
detecting, by the processor, a disaster situation in which a central inode list is inaccessible, wherein each entry in the central inode list corresponds to data stored in a block of storage space in memory, wherein the memory includes multiple blocks of storage space;
scanning, by the processor, information stored in each of the multiple blocks of storage space;
detecting, by the processor, each identifier included in the information, wherein an identifier in a given block of storage space is located at an end of data stored in the given block;

using, by the processor, each of the detected identifiers to locate a corresponding copy of an inode entry;

using, by the processor, each of the located inode entry copies to locate data which corresponds thereto; and copying, by the processor, the located data to a second memory.

23. The computer program product of claim 22, wherein the copy of an inode entry is located after the corresponding identifier in the respective block of storage space.

24. The computer program product of claim 22, the program instructions readable and/or executable by the processor to cause the processor to perform the method comprising:

determining, by the processor, whether two or more of the located inode entry copies have a timestamp corresponding thereto; and using, by the processor, the timestamps to deduplicate copies of a same inode entry in response to determining that two or more of the located inode entry copies have a timestamp corresponding thereto.

25. A computer-implemented method, comprising:

detecting a disaster situation in which a central inode list is inaccessible, wherein each entry in the central inode list corresponds to data stored in a block of storage space in memory, wherein the memory includes multiple blocks of storage space;

scanning information stored in each of the multiple blocks of storage space;

detecting each identifier included in the information, wherein an identifier in a given block of storage space is located at an end of data stored in the given block;

using each of the detected identifiers to locate a corresponding copy of an inode entry;

using each of the located inode entry copies to locate data which corresponds thereto; and copying the located data to a second memory, wherein the copy of an inode entry is located after the corresponding identifier in the respective block of storage space.

* * * * *